April 22, 1952 S. D. POOL 2,593,696
TRACTOR PROPELLED AGRICULTURAL SPRAYING APPARATUS
Filed Dec. 6, 1949 3 Sheets-Sheet 1
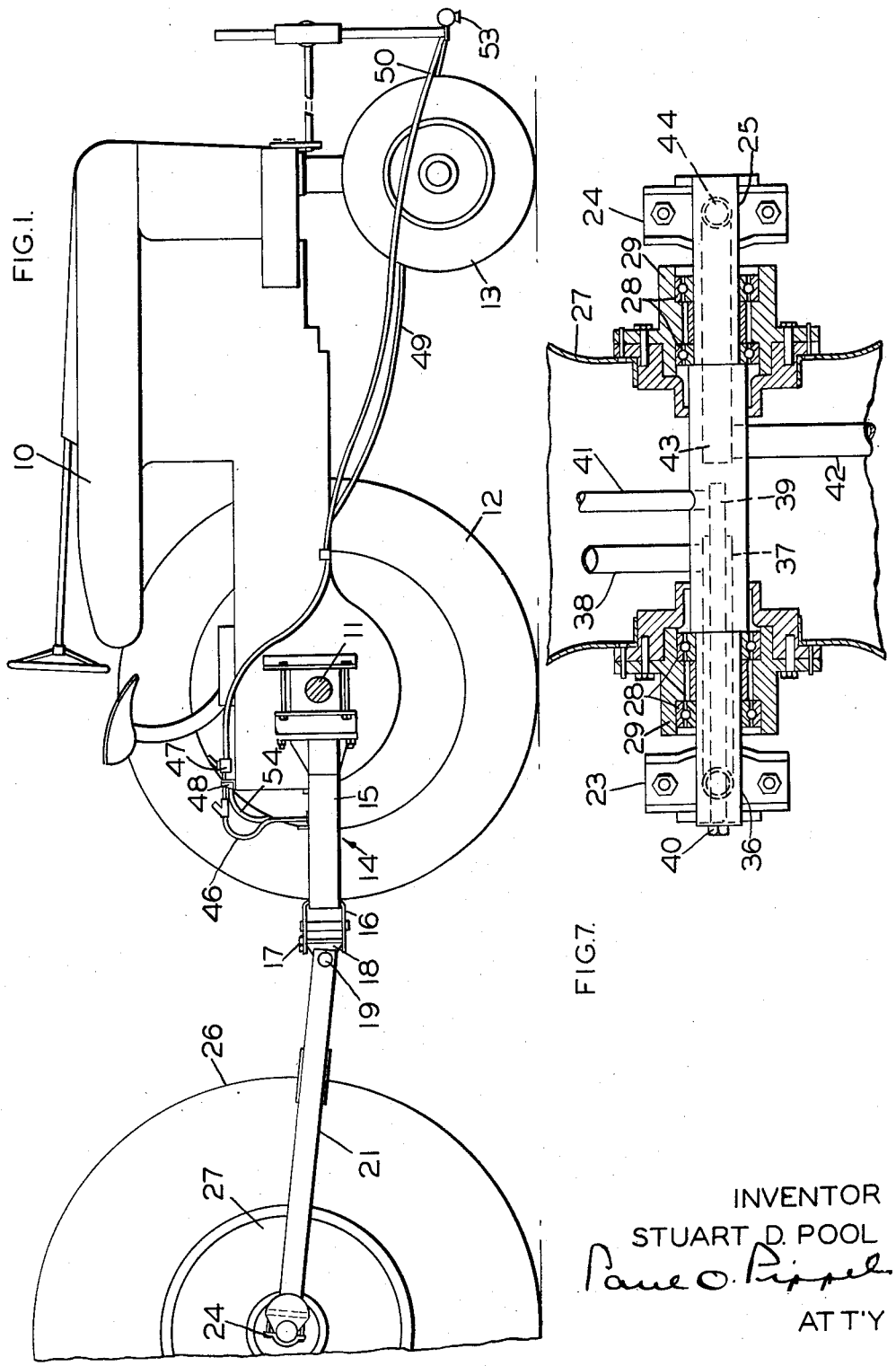
INVENTOR
STUART D. POOL
ATT'Y April 22, 1952   S. D. POOL   2,593,696
TRACTOR PROPELLED AGRICULTURAL SPRAYING APPARATUS
Filed Dec. 6, 1949   3 Sheets-Sheet 2
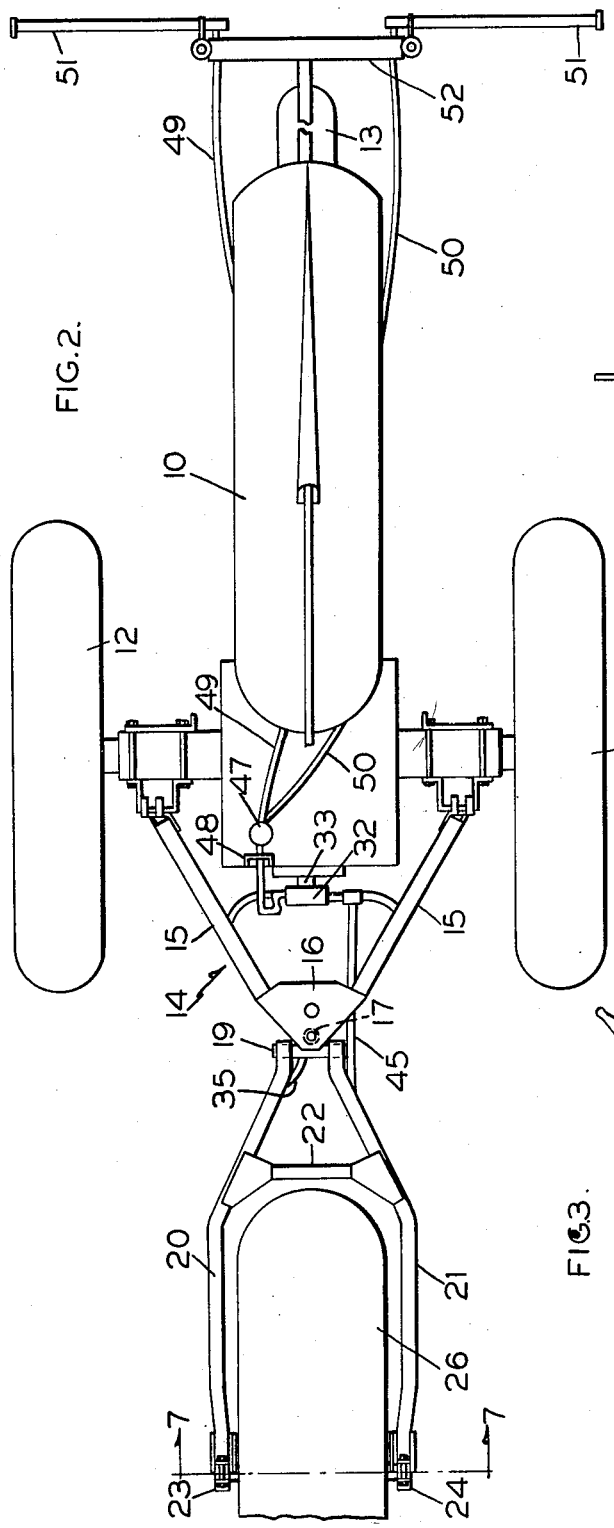
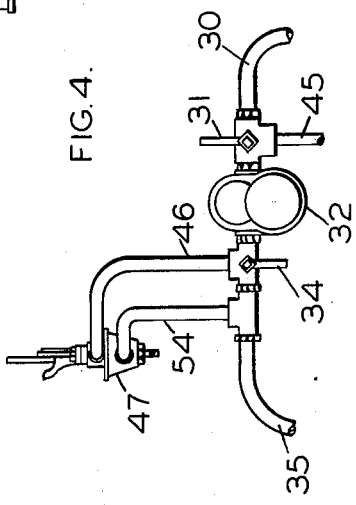
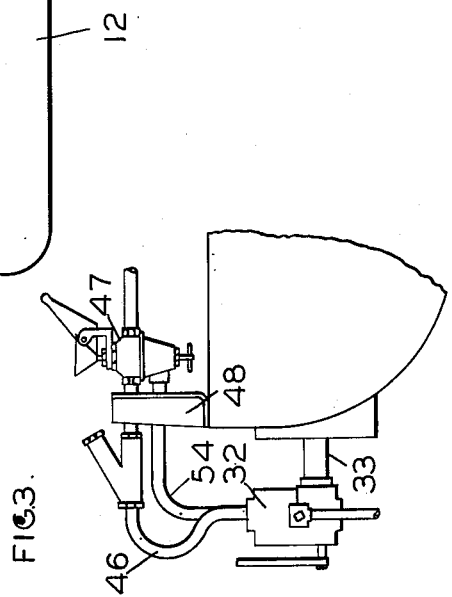
INVENTOR
STUART D. POOL
ATT'Y April 22, 1952     S. D. POOL     2,593,696
TRACTOR PROPELLED AGRICULTURAL SPRAYING APPARATUS
Filed Dec. 6, 1949     3 Sheets-Sheet 3
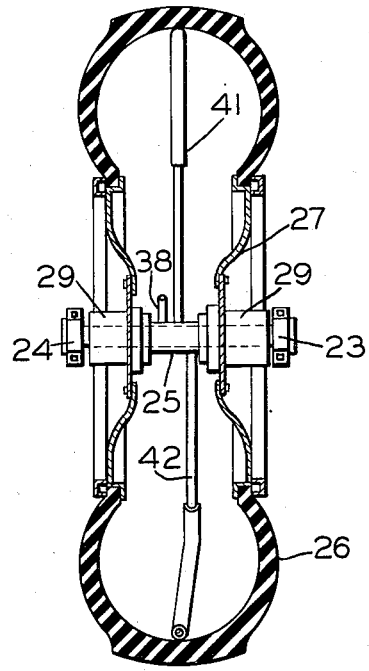
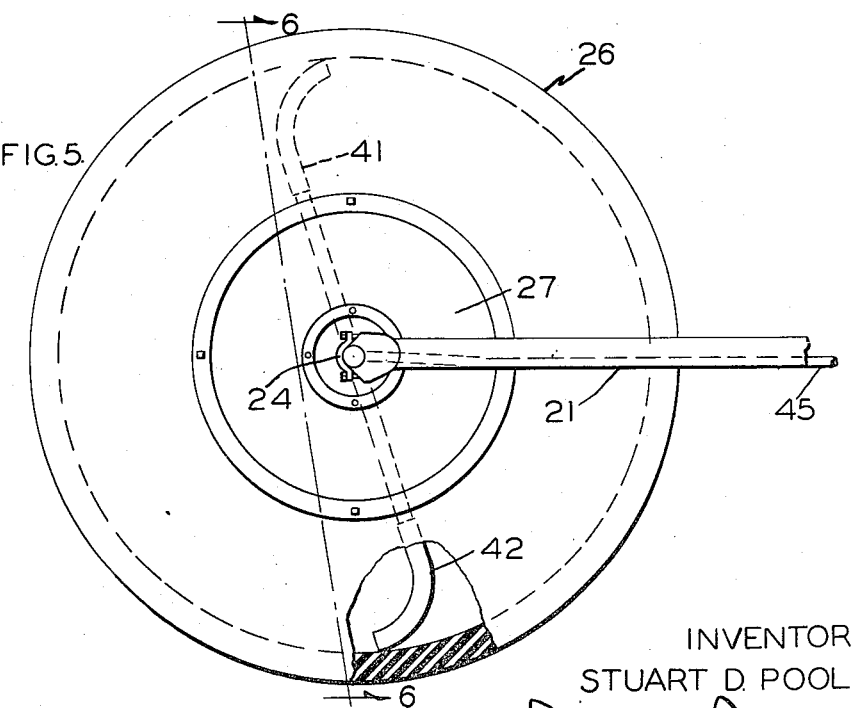
INVENTOR
STUART D. POOL
ATT'Y Patented Apr. 22, 1952

2,593,696

UNITED STATES PATENT OFFICE 2,593,696

TRACTOR PROPELLED AGRICULTURAL SPRAYING APPARATUS

Stuart D. Pool, Moline, Ill., assignor to International Harvester Company, a corporation of New Jersey Application December 6, 1949, Serial No. 131,352

7 Claims. (Cl. 299—29)

This invention relates to agricultural implements and particularly to spray equipment. An important object of the invention is to provide novel apparatus for spraying growing crops and other vegetation for the destruction of weeds, insects and the like.

Another object of the invention is to provide tractor propelled spray equipment wherein minimum weight is carried by the tractor resulting in minimum compaction of the soil by the tractor wheels.

Another object of the invention is to provide tractor propelled spray equipment adapted for spraying row crops, wherein the spray liquid is carried in a supply tank in the form of a ground engaging wheel arranged to travel between rows of plants.

A further object of the invention is to provide a novel storage tank for treating fluids in the form of a ground engaging wheel which provides its own agitation for the liquid and renders the use of special agitators unnecessary.

Other objects and advantages of the invention will become clear from the following detailed description when read in conjunction with the accompanying drawings, wherein:

Figure 1 is a view in side elevation of a tractor with spray equipment embodying the features of the present invention connected thereto;

Figure 2 is a plan view of the structure shown in Figure 1;

Figure 3 is an enlarged detail in side elevation of the rear portion of the tractor showing the spray controls;

Figure 4 is a rear elevation of the structure shown in Figure 3;

Figure 5 is a side elevation with a part broken away for clarity showing the ground engaging spray wheel of the present invention;

Figure 6 is a section on the line 6—6 of Figure 5; and

Figure 7 is an enlarged sectional detail taken on the line 7—7 of Figure 2.

Referring to the drawings, numeral 10 designates the tractor which is utilized to propel the spray equipment of the present invention and which provides the power for discharging the spray. Tractor 10 is provided with a rear axle 11, laterally spaced rear drive wheels 12, and a dirigible front wheel 13.

A drawbar 14 is formed by rearwardly converging bars 15, the forward ends of which are detachably secured to the housing for the tractor rear axle, and the rear ends of which are connected by a U-shaped plate 16. Plate 16 carries a vertically extending pivot bolt 17 having secured thereto a clevis 18 carrying a transverse pivot pin 19. Pin 19 is mounted at the forward end of a yoke formed by arms 20 and 21 braced by a cross-piece 22. The rear ends of the arms 20 and 21 are provided with clamps 23 and 24 in which are carried the ends of a transverse shaft 25 extending through the axis of a wheel comprising a casing 26 and a hub 27. The wheel is journaled for rotation upon bearings 28 carried in caps 29 secured to the wheel hubs.

The casing 26 is preferably of rubber or the like and serves as the dispensing receptacle for treating fluid to be sprayed. The tire is filled with fluid from an outside source through a hose line shown at 30. The fluid passes thence through a valve 31 to a pump 32 operated by the power take-off shaft 33 of the tractor. From the pump 32 fluid passes through a valve 34 to hose line 35 extending along arm 20 of the yoke and rearwardly to connect at 36 with an axial bore 37 provided in shaft 25. Bore 37 communicates with a radially extending tube 38 through which fluid is emptied into the tire.

Tube 39 is concentric with bore 37 and extends from the outside through nut 40 axially into the shaft and communicates with a tube 41 which extends radially from shaft 25. Tube 39 and tube 41 provide a vent for air in the tire to prevent pressure from building up within the tire when filling and causing a vacuum when fluid is being removed.

Fluid is withdrawn from the tire through a radial tube 42 which is connected to an axial bore 43 in shaft 25. Fluid passes from an opening 44 in the shaft 25 to a tube 45, which is connected to the shaft at 44 and extends forwardly along the arm 21 of the wheel yoke. Valves 31 and 34 are then turned to permit fluid to pass to pump 32 and from the pump through valve 34 and a hose line 46 to a combination fluid shut-off and regulator valve 47, supported upon a bracket 48 affixed to the body of the tractor.

Fluid from the regulator is transmitted through hose lines 49 and 50 to a pair of laterally projecting spray booms 51 at the front of the tractor and mounted upon a support 52 secured to the tractor. Booms 51 are provided with conventional spray nozzles such as indicated at 53 in Fig. 1. Excess fluid from the regulator 47 is returned through a by-pass conduit 54 and conduit 35 to the wheel tank.

Fluid passing through the booms 51 may be utilized for spraying many types of vegetation including row crops. The wheel tank is particularly adapted for the latter since it is arranged to travel between rows of plants. Likewise many treating fluids require agitation, and a wheel tank, such as has been devised by applicant, provides automatic agitation by the movement thereof over the ground. A further advantage of applicant's wheel tank is that it lessens the load upon the tractor incurred by conventional tractor-mounted metallic containers and diminishes the compaction of the soil by the wheels of the tractor. Compaction of the soil is diminished also because of the fact that the weight of treating fluid and container is distributed over a greater area of ground than with conventional equipment.

The invention has been described in its preferred embodiment. However, it should be understood that modifications may be made therein without departing from the spirit of the invention or the scope of the appended claims.

What is claimed is:

1. In spraying apparatus for the control of weeds, insects and the like, a tractive vehicle, spray nozzles mounted on the vehicle, a wheel having a hub portion, a fluid container in the form of a tire casing about the periphery of the hub, means accommodating lateral and vertical floating movement of the wheel with respect to the vehicle and the spray nozzles for connecting the wheel thereto, conduits providing communication between the interior and exterior of the tire casing for discharging the treating fluid therefrom, a connection between said conduits and the nozzles, and pumping means in said connection for withdrawing fluid from said container and directing it to the nozzles.

2. In spraying apparatus for the control of weeds, insects and the like, a ground engaging rotary member having a compartment adapted to serve as a supply tank for spray fluid and having a shaft extending axially therethrough, an axial bore in said shaft communicating with the fluid compartment for filling the latter with fluid, another axial bore in the shaft opening to the outside, a radial conduit providing communication between the fluid compartment and said last mentioned axial bore for evacuating air from the fluid compartment during filling thereof with fluid, and another axial bore in the shaft communicating with the fluid compartment for withdrawing fluid therefrom.

3. In spraying apparatus for the control of weeds, insects and the like, a ground engaging rotary member having a compartment serving as a supply tank for spray fluid and adapted to be propelled over the ground, means providing communication between the exterior of the member and said compartment for supplying fluid thereto, independent means providing communication between the fluid compartment and the exterior of said member for withdrawing fluid therefrom during rotation thereof, means for evacuating air from the compartment when supplying fluid thereto, and spray means for discharging the treating fluid upon the ground.

4. In spraying apparatus, a ground engaging rotary wheel having a hollow fluid-carrying tire portion, conduit means providing communication with the interior of the tire portion for supplying fluid thereto, another conduit means providing communication between the interior of the tire portion and the exterior of the wheel for withdrawing fluid therefrom during rotation thereof, and other conduit means providing free passage of air between the exterior and the interior of the tire portion during filling and withdrawal of fluid therefrom.

5. In spraying apparatus, a ground engaging rotary wheel having a hollow fluid-carrying tire portion and a shaft extending axially therethrough, an axial bore in said shaft communicating with the fluid compartment for admitting fluid to fill the compartment, another axial bore in the shaft independent of said first mentioned bore and communicating with the fluid compartment for withdrawing fluid therefrom, and a conduit concentric with one of said axial bores providing communication between the interior of said tire portion and the exterior for free passage of air during filling and withdrawal of fluid from the tire.

6. The combination with a tractor having spray nozzles mounted thereon, of a wheel in trailing relation to the tractor and connected thereto for lateral and vertical swinging movement relative to the tractor and to the spray nozzles, said wheel having a hub and a fluid-containing flexible tire portion, an axial bore formed in one side of said hub communicating with the interior of the wheel for supplying fluid thereto, an independent axial bore formed in the other side of the hub and communicating with the interior of the wheel through which fluid is discharged, and a connection between said last mentioned bore and the spray nozzles on the tractor for supplying fluid thereto.

7. The combination with a tractor having spray nozzles mounted thereon, of a wheel in trailing relation to the tractor and connected thereto for lateral and vertical swinging movement relative to the tractor and to the spray nozzles, said wheel having a hub and a fluid-containing flexible tire portion, an axial bore formed in one side of said hub communicating with the interior of the wheel for supplying fluid thereto, an independent axial bore formed in the other side of the hub and communicating with the interior of the wheel through which fluid is discharged, and a connection between said last mentioned bore and the spray nozzles on the tractor for supplying fluid thereto and a tube coaxial with one of said bores providing communication between the interior and exterior of said wheel to allow free passage of air therebetween.

STUART D. POOL.

REFERENCES CITED

The following references are of record in the file of this patent:

UNITED STATES PATENTS

| Number | Name | Date |
| --- | --- | --- |
| 426,664 | Donahoo | Apr. 29, 1890 |
| 1,095,710 | Cranwell | May 5, 1914 |
| 2,475,686 | Anderson | July 12, 1949 |